UNITED STATES PATENT OFFICE.

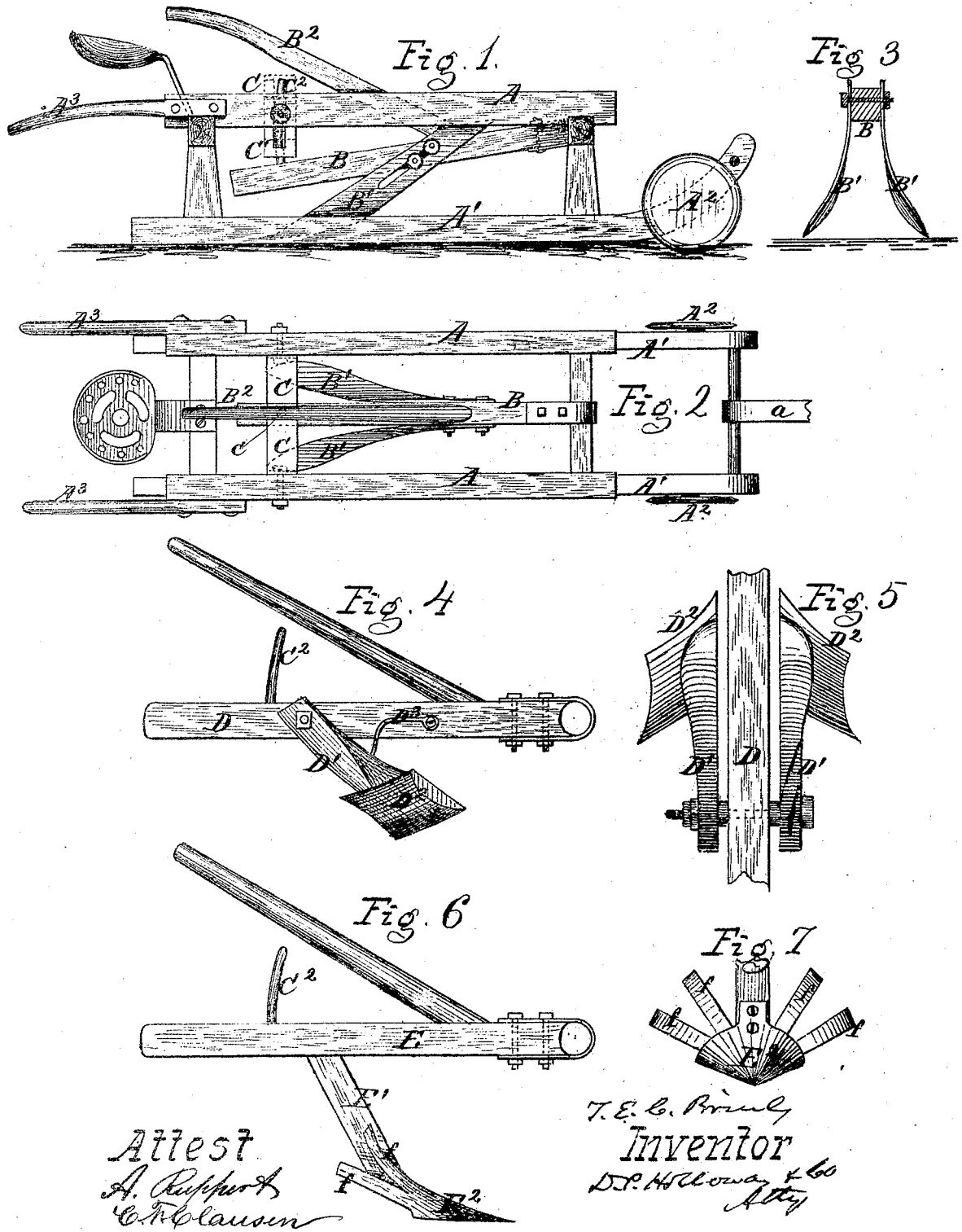

THOMAS E. C. BRINLY, OF LOUISVILLE, KENTUCKY.

IMPROVEMENT IN MACHINES FOR CUTTING POTATO VINES AND DIGGING POTATOES.

Specification forming part of Letters Patent No. 118,585, dated August 29, 1871.

*To all whom it may concern:*

Be it known that I, THOMAS E. C. BRINLY, of Louisville, in the county of Jefferson and State of Kentucky, have invented certain Improvements in Machines for Cutting Potato Vines and Digging Potatoes; and I do hereby declare that the following is a full, clear, and exact description thereof, reference being had to the annexed drawing making part of this specification, in which—

Figure 1 shows a side elevation of my improved machine as it appears when arranged for cutting potato vines. Fig. 2 is a plan view thereof. Fig. 3 is a transverse section through the beam to which the knives are secured. Figs. 4 and 5 are views of a cotton-scraper, which is substituted for the vine-cutter when the machine is to be used for scraping cotton. Figs. 6 and 7 are views of a plow, to be substituted for the vine-cutter in digging potatoes.

The same letters of reference are used in all the figures in the designation of identical parts.

This invention relates to a machine so constructed that it may be used for cutting off the vines of potatoes preparatory to digging them, and, by substituting for the cutter either a digger-plow or a cotton-scraper, also for digging potatoes and scraping cotton; and my improvement consists in novelties of construction, combination, and arrangement of some of the parts, to be more specifically pointed out hereinafter.

To enable those skilled in the art to make and use my invention, I will proceed to describe its construction and operation.

The frame-work A of the machine is mounted upon runners, $A^1$, which are placed sufficiently far apart to straddle a row of potato-hills or a row of cotton. In the employment of the machine for cutting off the vines of potatoes these runners are of especial advantage, as the vines will be firmly held under them while being cut off by the knives, and be prevented from clogging the latter. Upon the forward upturned end the runners carry each a circular revolving cutter, $A^2$, which, besides cutting long vines into two lengths, serve as guides for the sleigh, and enable it to readily turn in a short space on lifting the rear end of the sleigh by its handles $A^3$, provided for that purpose. The draft animals are hitched at $a$, and a seat for the driver is mounted upon the rear part of the machine, from which he can manage the horses as well as operate the cutter. The latter consists of a beam, B, hinged at the forward end to a cross-bar of the frame centrally between the runners, from which point it extends to the rear some distance beyond an adjustable guide-bar, C. The knives $B^1$ are attached to the beam in an oblique position, and are curved outward from the same, as best seen in Fig. 3, so as to reach vines which leave the ground some distance from the center of the ridge. The cutting-edges of the knives are, of course, presented forward, and they are made adjustable on the beam by means of an elongated slot in them, through which the bolts pass. Directly under the guide-bar C the beam has an upwardly-projecting finger or rod, $C^2$, bent into the arc of a circle, having its center at the point where the beam is hinged to the frame, and passing through an aperture, $c$, bored through the guide-bar. The handle $B^2$ of the beam is in convenient reach of the driver sitting on the seat, so that he can readily adjust the cutter to the proper height, while its parallelism with the runners is always maintained by its guide-rod $B^2$ and the guide-bar of the frame. This guide-bar is fastened to the side beams of the frame by its down-turned ends $C^1$, which are provided each with a vertical slot, $c'$, to admit of vertical adjustment. The cotton-scraper D, as also the potato-digger plow E, have beams similar to that of the vine-cutter, each having the guide-rod and the handle. The beam of the former carries a standard, $D^1$, upon each side, with a blade, $D^2$, of suitable form for scraping cotton, the standards being adjustable laterally to suit the varying width of rows of cotton in different fields, and tied to the beam by diagonal rod $D^3$ in the ordinary manner. The beam of the potato-digger carries a single standard, $E^1$, to the lower end of which the digger-plow $E^2$ is firmly secured. The latter is of triangular form, as shown in Fig. 7, provided with a series of upturned fingers, $f$, at the base or rear side, which forms a screen for sifting the loose soil through while the potatoes are thrown off at either side. The share of the digger is of peculiar construction, in that its converging edges are turned under or rounded so as not to cut the potatoes.

The vine-cutter, cotton-scraper, and potato-digger can, as has heretofore been stated, be substituted one for the other, to adapt the machine to the different purposes spoken of.

What I claim as my invention, and desire to secure by Letters Patent, is—

1. The combination of the vine-cutter B B$^1$ and the frame A, when the latter is mounted upon runners A$^1$, substantially as and for the purpose set forth.

2. The combination of the sleigh A A$^1$, revolving cutters A$^2$, and handles A$^3$, substantially as and for the purpose set forth.

In testimony whereof I have signed my name to this specification in the presence of two subscribing witnesses.

T. E. C. BRINLY.

Witnesses:
WM. SINETT,
F. HAMMOND.